United States Patent [19]
Hudson et al.

[11] Patent Number: 5,960,658
[45] Date of Patent: Oct. 5, 1999

[54] METHOD OF BLOW MOLDING

[75] Inventors: John Hudson, LaGrange; David Lee Prichard, Franklin, both of Ga.

[73] Assignee: JAC Products, Inc., Ann Arbor, Mich.

[21] Appl. No.: 09/023,446

[22] Filed: Feb. 13, 1998

[51] Int. Cl.⁶ .......................... B21D 39/20; B21D 26/02
[52] U.S. Cl. .................................................. 72/61; 72/709
[58] Field of Search .................. 72/61, 62, 709

[56] References Cited

U.S. PATENT DOCUMENTS

| | | | |
|---|---|---|---|
| 3,896,648 | 7/1975 | Schertenlieb | 72/61 |
| 4,774,826 | 10/1988 | Hann | 72/61 |
| 5,273,707 | 12/1993 | Carroll . | |
| 5,303,570 | 4/1994 | Kaiser | 72/61 |
| 5,439,365 | 8/1995 | Hendry . | |
| 5,622,298 | 4/1997 | Cucheran et al. . | |
| 5,649,439 | 7/1997 | Schulz | 72/709 |
| 5,716,560 | 2/1998 | Heuchert et al. . | |

FOREIGN PATENT DOCUMENTS

| | | | |
|---|---|---|---|
| 9318 | 7/1962 | Japan | 72/61 |
| 61-49735 | 3/1986 | Japan | 72/61 |
| 0259624 | 11/1987 | Japan | 72/61 |
| 0270228 | 11/1987 | Japan | 72/61 |

OTHER PUBLICATIONS

U.S. Patent serial No. 08/638,167, filed Apr. 26, 1996, presently pending and allowed Apr. 4, 1997.

*Primary Examiner*—David Jones
*Attorney, Agent, or Firm*—Harness, Dickey & Pierce, PLC

[57] ABSTRACT

A blow molding method for use with tubular metal work pieces. The method involves placing a tubular metal component part into a molding tool having an internal molding cavity and at least one access passageway into which the component is inserted. The molding tool is then heated to a temperature between about 1000° F. and 1200° F. and a high pressure gas is injected into the tubular component. The high pressure gas causes the portion of the work component residing within the internal mold cavity of the molding tool to expand and assume the shape of the internal molding cavity. After a cooling period, the component is removed from the molding tool. The process is particularly well suited for forming the end support portions of side rails used with vehicle article carriers, but can be used to form a wide variety of complexly shaped forms from tubular metal workpieces.

9 Claims, 3 Drawing Sheets

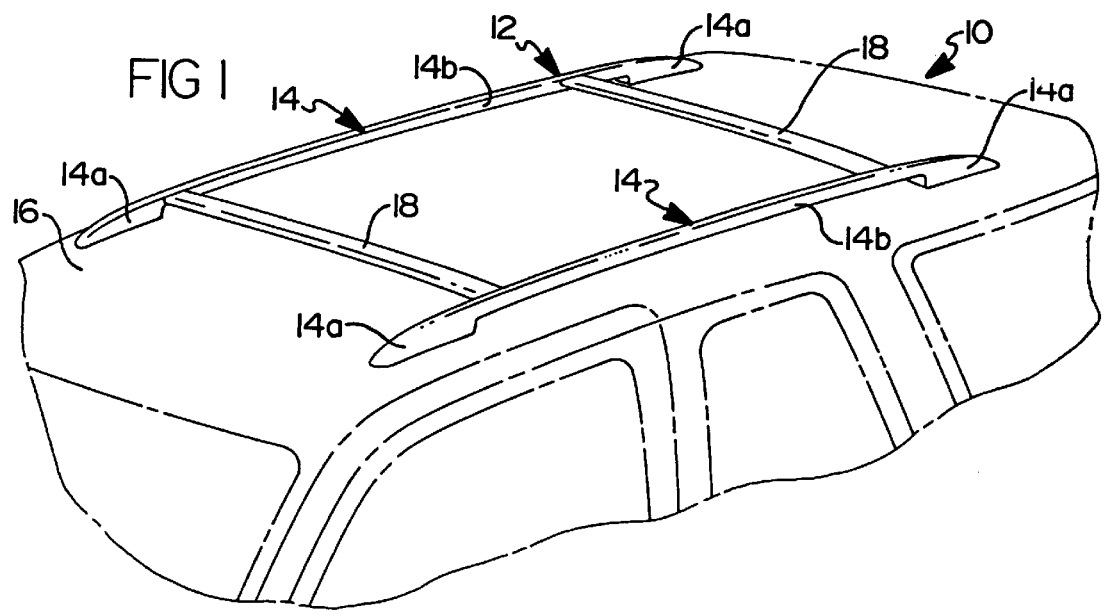
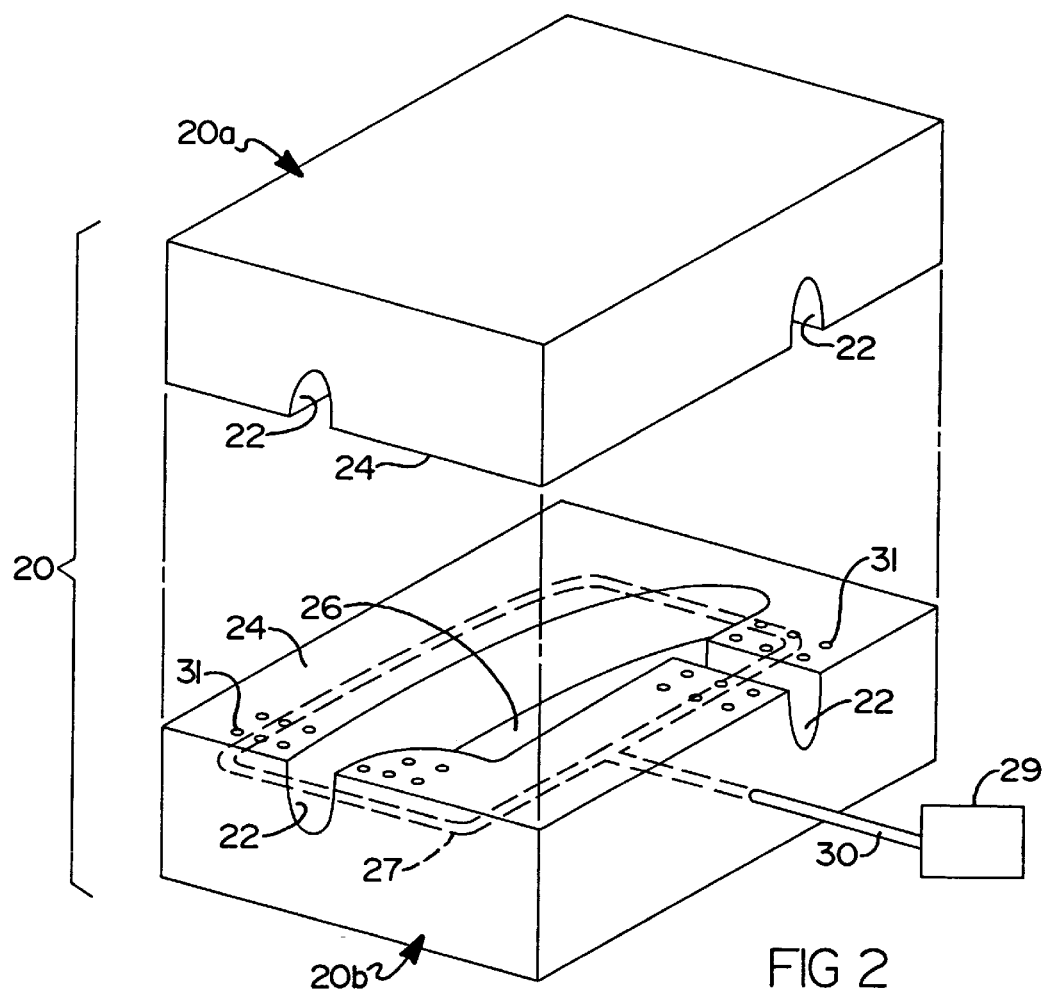

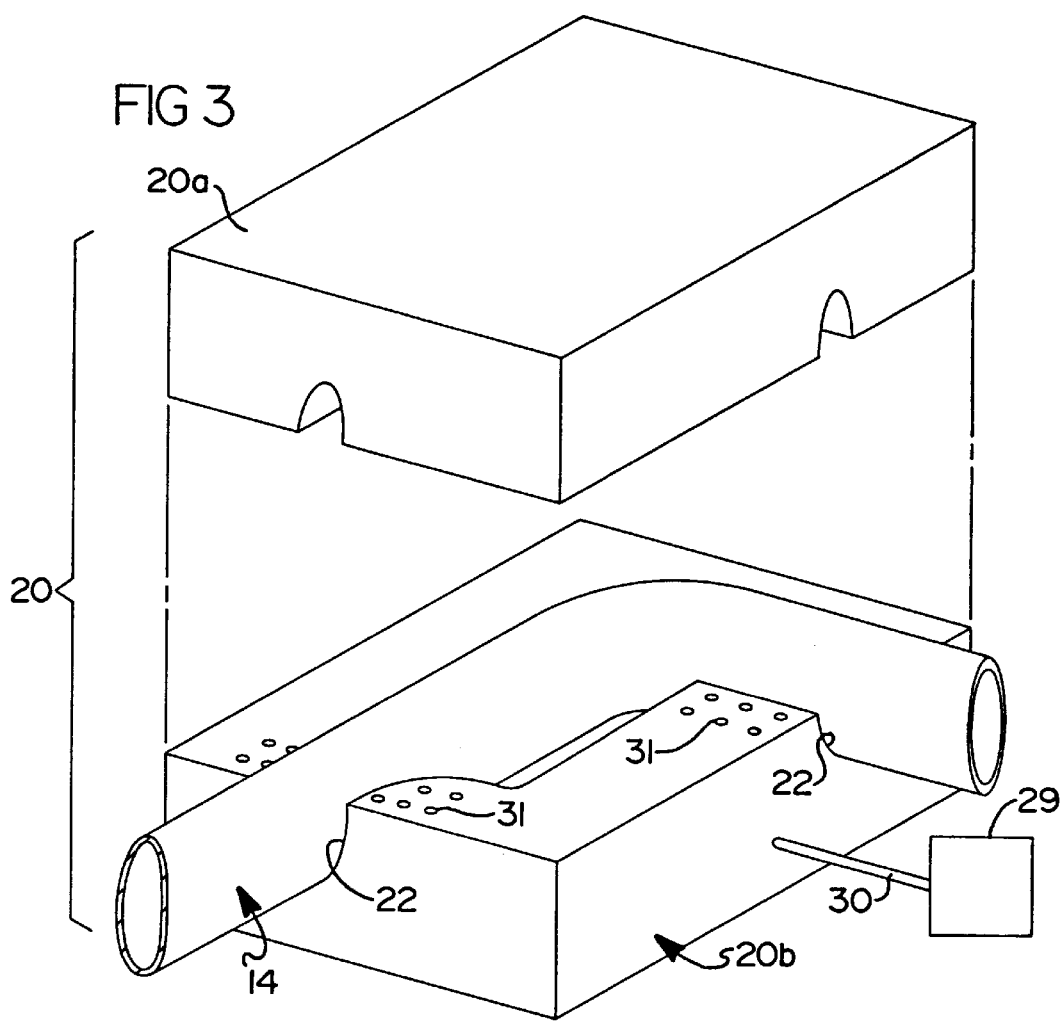
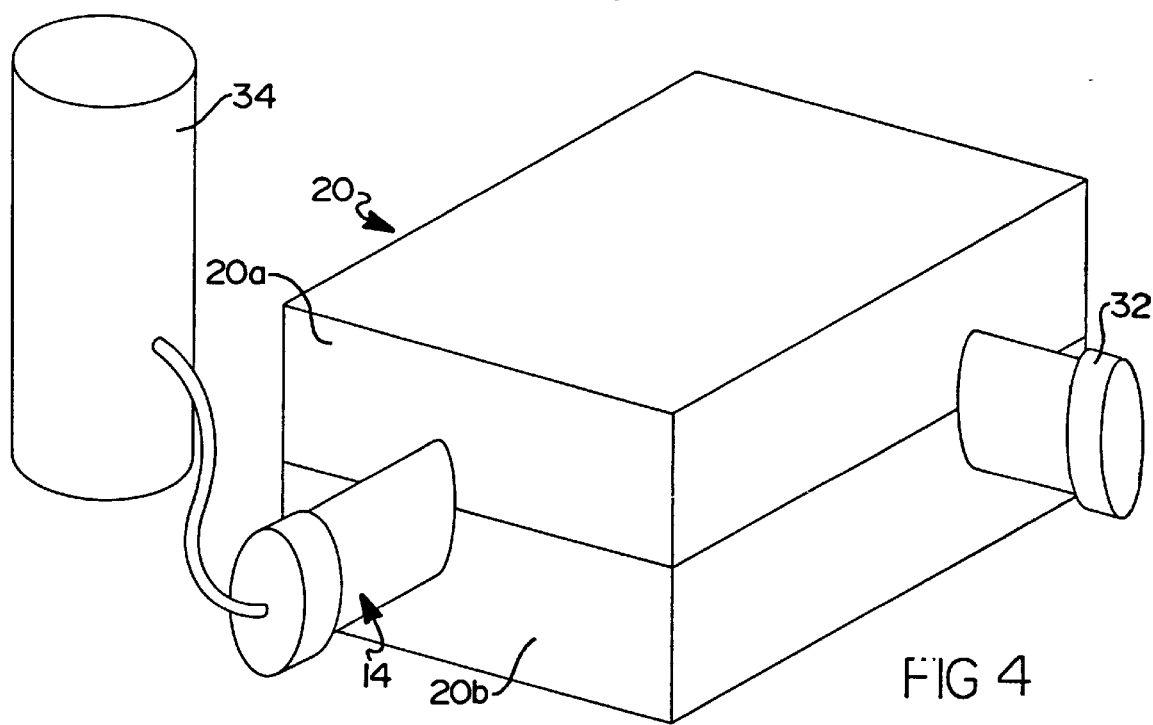

METHOD OF BLOW MOLDING

BACKGROUND OF THE INVENTION

1. Technical Field

This invention relates to molding techniques, and more particularly to a technique for blow molding a tubular metal part to cause the part to assume a desired shape along at least a portion of the length of the part.

2. Discussion

Various molding techniques are used in a wide variety of applications to form various components, most typically from plastics. One common technique is known in the art as injection molding. With injection molding, a quantity of molten plastic is injected into a mold under pressure. The molten plastic is then allowed to cool. When removed from the mold, the plastic will have assumed the shape of the cavity of the mold.

While molding techniques such as injection molding have proved to be valuable in forming a wide variety of components, until the present time there has been no means for modifying the shape of existing tubular components through conventional molding techniques. Accordingly, up until the present time it has not been possible to take, for example, a tubular, extruded length of metal such as aluminum and form a portion of the metal into an enlarged shape. More specifically, it has not been possible to take a tubular, extruded length of aluminum, which is to form a component of a vehicle article carrier, and to mold the aluminum via the use of a heated molding tool and a pressurized gas such that a portion is enlarged in the shape of an end support. Such a process would permit elongated, tubular lengths of metal such as aluminum to be molded into various complex shapes.

It is therefore a principal object of the present invention to provide a molding process by which a tubular length of material such as aluminum can be modified such that one or more portions of the length of aluminum are formed into a desired, complex shape.

It is still another object of the present invention to provide a method of molding by which a length of tubular metal material such as aluminum may have one or more portions of its length modified to a desired complex shape, without affecting other portions of the length of material which do not need to be modified in shape.

It is still another object of the present invention to provide a method of molding by which a length of elongated, metal material may be quickly and easily inserted into a molding tool which causes one or more portions of the length of material to be enlarged into a desired shape without the need to perform numerous steps in the molding process.

SUMMARY OF THE INVENTION

The above and other objects are provided by a preferred method for blow molding metal parts. The method involves providing a molding tool having first and second portions. Each of the first and second portions includes an access opening in communication with a cavity portion. When the first and second molding portions are placed together, they cooperatively form an access passageway in communication with an internal molding cavity. The internal molding cavity forms a desired shape, such as the outer contour of an end support for a side rail of a vehicle article carrier.

A length of tubular metal material is inserted through the access passageway and into the internal molding cavity of the molding tool. The ends of the metal part are capped or otherwise sealed. The molding tool, having been pre-heated to a relatively high temperature for a predetermined length of time, heats the portion of the metal part residing within the internal molding cavity. A gas under pressure is then injected into the tubular metal part which causes the portion of the part residing within the internal molding cavity to expand and conform to the contour of the internal molding cavity. The molding tool is then allowed to cool before separating the first and second portions thereof and removing the metal part. The finished metal part has a portion which assumes the shape of the internal molding cavity.

In the preferred embodiment the molding tool is heated to a temperature between about 1000° F. and 1200° F., and more preferably to a temperature of about 1130° F. The heating may be accomplished by any suitable means, but is preferably through direct induction heating techniques or electromagnetic induction heating techniques. The gas injected into the tubular part is preferably nitrogen gas under a pressure of between about 400 psi–500 psi.

In an alternative preferred method the first and second portions of the molding tool each include a pair of access openings which both communicate with the molding cavity. When the first and second portions of the molding tool are placed together, a pair of access passageways are formed through which a portion of a metal part may be extended. In this manner a portion of the metal part intermediate the two extreme ends of the part can be molded to assume a desired shape.

The preferred method of the present invention provides a quick, easy and economical means for molding tubular metal parts to assume complex shapes. In particular, the method of the present invention is particularly well suited for molding the end support portions of a side rail of a vehicle article carrier.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of a portion of a vehicle showing a vehicle article carrier disposed thereon, wherein the vehicle article carrier includes a pair of side rails adapted to be secured to an outer body surface of the vehicle;

FIG. 2 is a perspective view of a molding tool having first and second portions separated from one another, illustrating the cavity of each portion of the molding tool;

FIG. 3 is an exploded, perspective view of the molding tool of FIG. 2 showing a portion of a length of tubular metal material placed within one portion of the molding tool;

FIG. 4 is a perspective view showing the molding tool closed over a portion of the tubular metal part with a source of pressurized gas coupled to the tubular metal part and applying pressurized gas into the metal part.

DETAILED DESCRIPTION OF THE PREFERRED EMBODIMENTS

Figure 5:
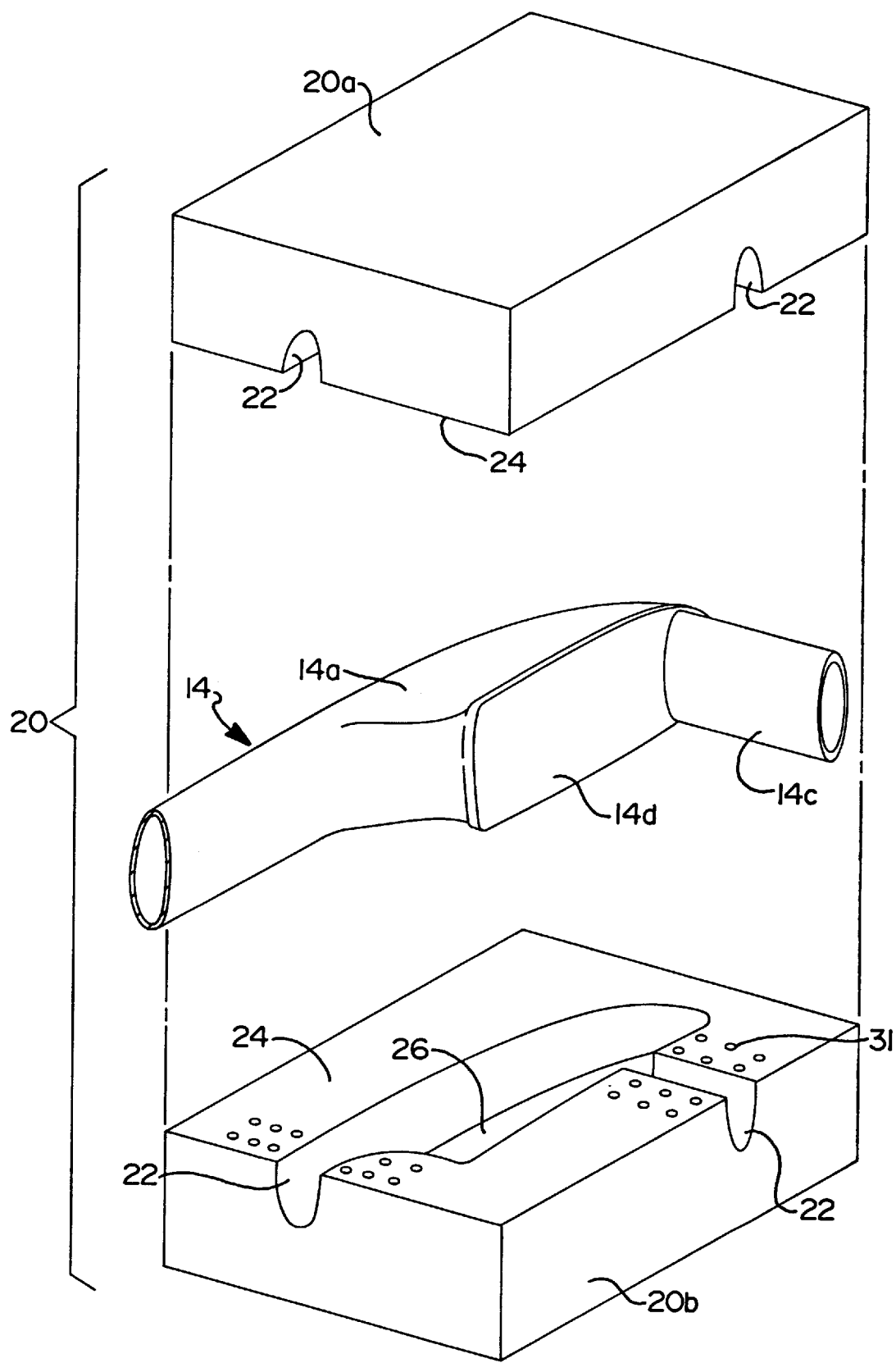
FIG. 5 is a view showing the first and second portions of the molding tool separated after the molding tool is cooled and the metal part removed therefrom.

Referring to FIG. 1, there is shown a vehicle 10 having a vehicle article carrier 12 disposed thereon. The vehicle article carrier 12 includes a pair of side rails 14 which are adapted to be fixedly secured to an outer body surface 16 of the vehicle 10. A pair of cross bars 18 are also preferably included for helping to support articles above the outer body surface 16. While the method of the present invention lends itself particularly well to the manufacture of one piece side rails of a vehicle article carrier, such as side rails 14 illustrated in FIG. 1, the method is not limited to merely the production of side rails, but is applicable to the manufacture of virtually any form of part in which at least a portion of a length of metal material is required to be modified in shape. Merely as an example, the drawings and the following description make reference to the forming of an end support of a one piece side rail of a vehicle article carrier.

With further reference to FIG. 1, it will be noted that each of the side rails 14 includes a pair of enlarged end support portions 14a and a center support portion 14b. Each of the side rails 14, through the method of the present invention, are formed from an extruded length of aluminum, although it will be appreciated that a variety of other metals and processes could also be used to form the side rails 14.

Referring now to FIG. 2, the process of forming the end support portions 14a of the side rail 14 will be described. Initially, the method of the present invention involves providing a molding tool 20 having first and second portions 20a and 20b, respectively. Portions 20a and 20b are mirror images of one another and therefore only portion 20b will be described. Portion 20b is formed from a block of metal to include at least one access opening 22, and more preferably a pair of access openings 22, which may extend longitudinally in line with one another or which may be offset from one another as illustrated in FIG. 2. Access openings 22 are essentially recessed portions in a face 24 of the molding portion 20b which are machined during manufacture of the molding tool 20 in accordance with the desired cross-sectional profile of the tubular workpiece. A mold cavity 26 is also machined or otherwise formed in the molding portion 20b. The molding cavity 26 is in communication with both access openings 22.

Each molding portion 20a and 20b also includes heating elements 27 formed therein during its manufacture or added thereafter in the vicinity of the molding cavity 26. These heating elements, for example, in one embodiment comprise one or more resistive coiled wires within a stainless steel sleeve. The wire 26 is coupled to an external electric current source 29 which is used to heat the tube which will form the side rail 14 during the molding process. This is understood as direct induction heating or resistance heating. Alternatively, the heating could be performed by generating an electromagnetic flux from either inside the tubular workpiece which is inserted into the molding tool 20 or outside of the tubular workpiece. This is known in the art as electromagnetic induction heating or simply induction heating. Still further, conduction heating from resistive heating elements placed inside the tubular workpiece could be used to heat the molding tool 20. Still further, combinations of direct induction heating and conduction heating, or a combination of electromagnetic induction heating and conduction heating could be used to heat the tubular workpiece.

Referring further to FIG. 2, each portion 20a and 20b of the molding tool 20 preferably includes a plurality of openings 31 which are either formed during manufacture of the portions 20a and 20b or drilled into the portions subsequently. The openings 31 permit the areas of the molding tool 20b adjacent the access openings 22 to cool slightly. The advantage of this will be described momentarily.

Referring now to FIG. 3, a portion of a tubular, elongated metal part, in this instance a portion of side rail 14 shown in FIG. 1, is placed within portion 20b of the molding tool 20 such that it extends through the access openings 22. In FIG. 4, the mold portions 20a and 20b are closed over the side rail 14 and the molding tool 20 is heated to a temperature of between about 1000° F. and 1200° F., and more preferably to about 1130° F. A conductor 30 attached to a power source provides electric current to the resistive heating element 27 to heat the molding tool 20. The molding tool is heated for a time which varies upon the size of the portion of the work piece or part which is being molded, but is sufficient to bring the temperature of the tool up to a temperature within the above described temperature range.

Referring to FIG. 4, one end of the side rail 14 is sealed or "capped" by a cap or other like member 32 and a source of pressurized gas 34 is coupled to the opposite end of the side rail 14. The pressurized gas is preferably a nitrogen gas delivered under a pressure of preferably about 400 psi–500 psi, and more preferably about 450 psi–500 psi. The pressurized gas is applied for a time of about 10 seconds–60 seconds, and more preferably about 15 seconds. This causes the portion of the side rail 14 residing within the internal mold cavity 26 (FIGS. 2 and 3) to expand and assume the contour of the internal mold cavity.

Referring now to FIG. 5, after the source of pressurized gas 34 has been removed from the side rail 14 the side rail is allowed to cool for a brief length of time, and preferably at least about 5 seconds–10 seconds, before the mold portions 20a and 20b are separated. The side rail 14 is then removed from the molding portion 20b of the molding tool 20. The side rail 14 now includes an end support portion 14a in the shape of the internal mold cavity 26.

Referring further to FIG. 5, the side rail 14, after the molding process is completed, will still include a scrap portion 14c. Portion 14c represents the end of the side rail 14 that was sealed during the molding process. This portion may be simply cut off and a lower surface 14d of the end support portion 14a de-burred to form a smooth lower surface which is adapted to be secured against the outer body surface 16 of the vehicle 10 (FIG. 1).

From the above it can be seen that the blow molding process of the present invention provides a means for readily and easily modifying the shape of tubular metal parts into complex shapes which would not be possible with other forms of molding or extrusion techniques. It will also be appreciated that when a side rail such as side rail 14 is to be formed, that the steps described in connection with FIGS. 2–5 are performed at each end, and possibly the middle, of the side rail 14 to produce the support portions 14a for each side rail 14. These operations may be performed simultaneously when the high pressure nitrogen gas is injected into the intermediate portion 14b of the side rail 14, and provided that two independent molding tools 20 are disposed at each support location ends of the side rail 14.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for blow forming a metal tubular component into a single piece article carrier component such as an end support rail, the method comprising the steps of:

providing a molding tool having a first piece and a second piece with each of said first and second pieces forming an internal mold cavity when placed adjacent one another, each one of said first and second pieces including access portions which, when said first and second portions of said mold tool are placed adjacent one another, form first and second access openings extending orthogonally to one another such that an intermediate portion of a metal tubular member having a substantially 90° bend may be placed within said first and second pieces and have its end portions protruding from said access portions before said first and second pieces are placed adjacent one another;

placing said metal tubular member in one of said first and second pieces of said molding tool such that said end portions protrude out of said access portions, and placing the other one of said first and second pieces against said piece holding said metal tubular member;

heating said molding tool to a temperature of between about 9000° F.–1200° F.;

injecting a gas into said metal tubular member, said gas being under pressure to cause said intermediate portion of said metal tubular member disposed within said internal mold cavity to expand and conform to said internal mold cavity;

allowing said mold tool to cool; and separating said first and second portions of said molding tool and removing said metal tubular member from said internal mold cavity.

2. The method of claim 1, wherein the step of heating said mold tool comprises the step of heating said mold tool to about 1030° F.

3. The method of claim 1, wherein the step of heating said mold tool comprises supplying an electric current to a resistive element associated with said mold tool for a minimum predetermined time.

4. A method of blow forming a hollow part comprising the steps of:

providing a two-piece mold having a first piece and a second piece, each one of said first and second pieces having a pair of access openings which, when said first and second mold pieces are placed adjacent one another, form a pair of passageways extending orthogonally from one another through which a tubular member having a substantially 90° bending portion may extend, each of said first and second mold tools further including a cavity which, when said mold tools are placed adjacent one another, cooperatively form an end support portion having a desired shape;

placing a tubular member in one of said first and second pieces of said mold such that end portions of said tubular member protrude out of said access openings at substantially 90° angles toward one another;

placing the other of said pieces against said piece in which said tubular member is resting;

heating said mold tool around said internal mold cavity; injecting a gas under pressure into said tubular member to thereby cause said tubular member to expand and assume the shape of said internal mold cavity;

allowing said molding tool to cool; and separating said first and second portions of said mold tool and removing said tubular member therefrom.

5. The method of claim 4, wherein the step of heating said molding tool comprises heating said molding tool to a temperature of between about 1000° F.–1200° F.

6. The method of claim 5, wherein said molding tool is heated by direct induction heating.

7. The method of claim 4, wherein the molding tool is heated by electromagnetic conduction.

8. The method of claim 4, wherein the step of injecting said gas under pressure comprises injecting nitrogen gas under pressure into said tubular member for a predetermined length of time.

9. The method of claim 4, wherein the step of inserting a portion of said tubular member into said molding tool comprises inserting a portion of an extruded, tubular aluminum member into said molding tool.

\* \* \* \* \*

UNITED STATES PATENT AND TRADEMARK OFFICE
CERTIFICATE OF CORRECTION

PATENT NO. : 5,960,658
DATED : October 5, 1999
INVENTOR(S) : John Hudson et al

It is certified that error appears in the above-identified patent and that said Letters Patent is hereby corrected as shown below:

Col. 5, line 18, claim 1, "9000°F" should be --1000°F--

Signed and Sealed this

Sixth Day of June, 2000

Attest:

Q. TODD DICKINSON

*Attesting Officer*   *Director of Patents and Trademarks*